United States Patent [19]

Najour et al.

[11] 3,960,806

[45] June 1, 1976

[54] FLAME RESISTANT LINEAR POLYESTERS

[75] Inventors: Gerald Costa Najour; Peter Ray Witt, both of Kinston, N.C.

[73] Assignee: Emery Industries, Inc., Cincinnati, Ohio

[22] Filed: July 7, 1975

[21] Appl. No.: 591,918

Related U.S. Application Data

[63] Continuation of Ser. No. 449,780, March 11, 1974, Pat. No. 3,909,482, which is a continuation-in-part of Ser. No. 301,812, Oct. 30, 1972, abandoned.

[52] U.S. Cl. ............... 260/40 P; 260/45.75 B; 260/45.95 G; 260/75 H
[51] Int. Cl.² ............... C08J 3/20; C08G 63/46
[58] Field of Search ............... 260/45.95 G, 45.75 B, 260/40 P, 75

[56] References Cited
UNITED STATES PATENTS

| | | | |
|---|---|---|---|
| 2,902,518 | 9/1959 | Hurdis et al. | 260/75 |
| 3,400,174 | 9/1968 | Heidel et al. | 260/869 |
| 3,651,017 | 3/1972 | Tanabe et al. | 260/75 |
| 3,712,904 | 1/1973 | Bode et al. | 8/1 |
| 3,749,600 | 7/1973 | Bergman et al. | 260/45.95 |

*Primary Examiner*—V. P. Hoke
*Attorney, Agent, or Firm*—Gerald A. Baracka; John D. Rice

[57] ABSTRACT

Flame-retardant polyester filaments of excellent whiteness are prepared from dimethyl terephthalate, ethylene glycol and 2,2-bis-[4-(2-hydroxyethoxy)-3,5-dibromophenyl] propane by a continuous process as illustrated in the drawing. Conducting the polymerization within a holdup time of 2.5 hours at temperatures from about 273° to about 290° C. is shown to provide flame-retardant filaments having excellent whiteness. Addition of 7-naphtha-triazinyl-3-phenylcoumarin and a blue toner further improve the whiteness value and the inclusion of antimony oxide provides even greater flame retardance.

4 Claims, 1 Drawing Figure

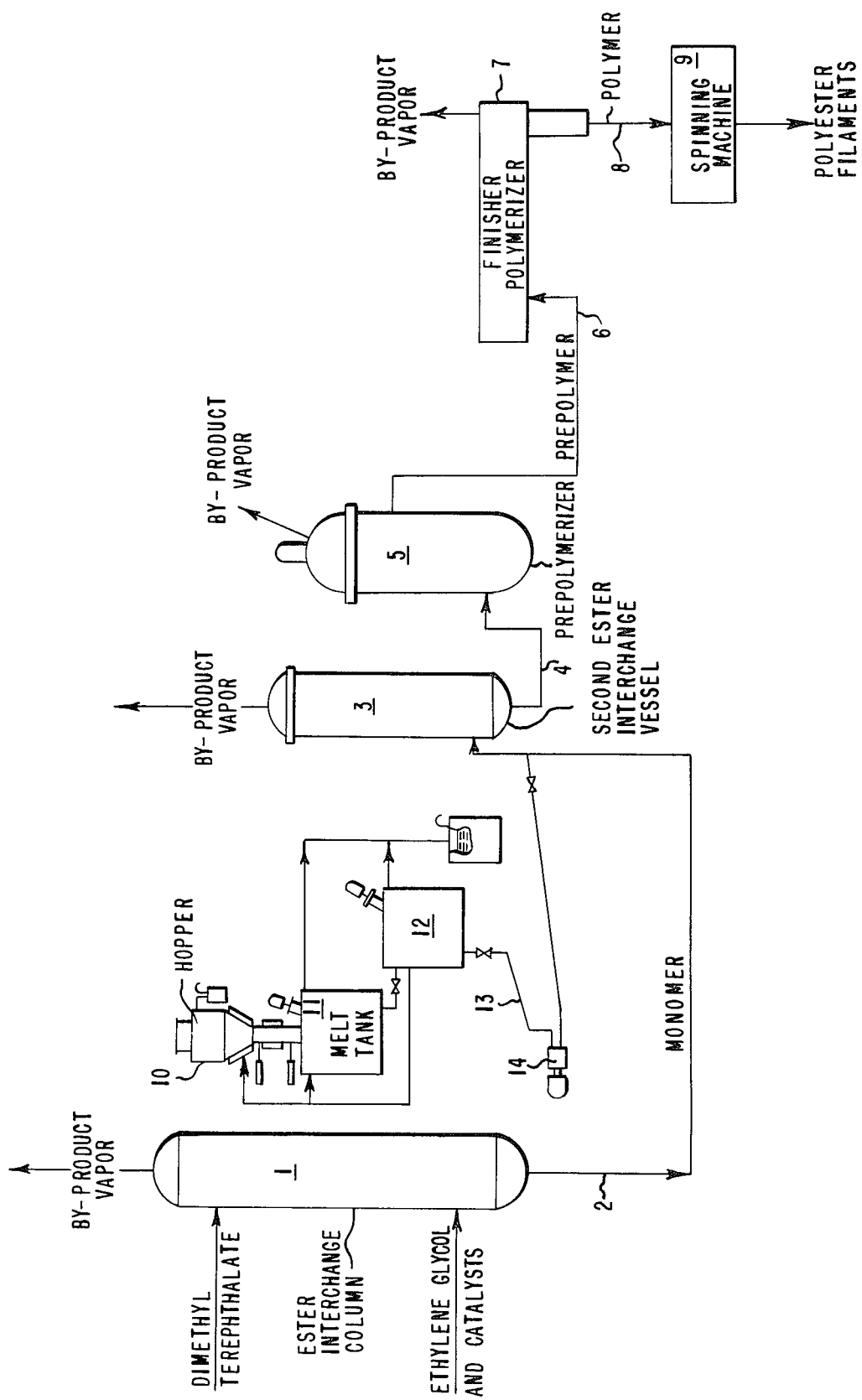

FLAME RESISTANT LINEAR POLYESTERS

CROSS-REFERENCES

This is a continuation of copending application Ser. No. 449,780 filed Mar. 11, 1974 now U.S. Pat. No. 3,909,482 which is a continuation-in-part of application Ser. No. 301,812 filed Oct. 30, 1972, now abandoned.

BACKGROUND OF THE INVENTION

This invention relates to flame-retardant polyester filaments suitable for use in textile fabrics, and is more particularly concerned with a continuous process for producing them.

Serious difficulties have been encountered in preparing flame-retardant polyester filaments for use in textile fabrics. The flame-retardant compound must not adversely affect the whiteness, hand and strength; it must have the proper combination of melt stability, melting point, low volatility, photostability and low toxicity; and it must impart an adequate flame retardancy which is durable against removal in fabric finishing and use.

Halogenated compounds have been used in synthetic polymers to impart flame retardant properties. One such compound which has been suggested for the production of copolyester fibers having improved flame retardance is 2,2-bis-[4-(2-hydroxyethoxy)-3,5-dibromophenyl] propane. This compound (designated herein as HDP) is represented by the structural formula

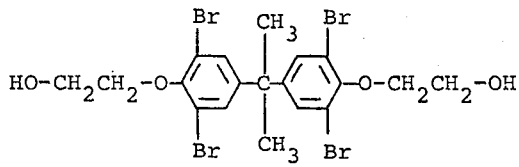

Since HDP is a glycol, it can be copolymerized with the polyester to avoid difficulties with removal encountered with melt additives.

SUMMARY OF THE INVENTION

The present invention is an improvement in the production of flame-retardant polyethylene terephthalate filaments to obtain polyester filaments of excellent whiteness by a continuous process of feeding dimethyl terephthalate and ethylene glycol components to ester interchanger means and reacting the components to form di-β-hydroxyethyl terephthalate monomer, feeding the monomer to a prepolymerizer and polymerizing the monomer to form low molecular weight prepolymer, feeding the prepolymer to a finish polymerizer and completing the polymerization to form fiber-forming polymer, and feeding the polymer to a spinning machine and melt-spinning the polymer into filaments.

In accordance with the improvement, flame-retardant filaments of excellent whiteness, suitable for use in textile fabrics, are produced by continuously adding an optical brightener, a blue toner and a molten stream of 2,2-bis-[4-(2-hydroxyethoxy)-3,5-dibromophenyl] propane to the di-β-hydroxyethyl terephthalate monomer coming from the ester interchanger in the above process and conducting the polymerization within a holdup time of 2.5 hours at temperatures from about 273° to about 290° C. to form fiberforming copolyester which is then melt-spun into filaments. An amount of HDP is added which provides from about 4 to about 5 mole percent based on glycol terephthalate structural units present in the copolyester produced. Improved whiteness values of the filaments are obtained by also adding to the monomer up to 400 parts per million (ppm) 7-naphthatriazinyl-3-phenylcoumarin optical brightener and up to 100 parts per million of a blue toner to the di-β-hydroxyethyl terephthalate. Preferably the amount of brightener in the polyester will range from about 125 to 200 ppm and the toner will range from about 25 to 75 ppm. The flame retardancy can also be further increased by adding 1 to 2 percent by weight of antimony oxide.

BRIEF DESCRIPTION OF THE DRAWING

The drawing is a schematic illustration of a continuous system suitable for use in practicing the present invention.

DETAILED DISCLOSURE

Referring to the drawing, dimethyl terephthalate, ethylene glycol and catalyst are supplied to ester interchange column 1 where the ester exchange reaction is carried out and methanol removed from the top of the column as vapor. Liquid product comprising primarily bis-β-hydroxyethyl terephthalate containing a small amount of low polymer and glycol is continuously removed from the column through transfer line 2 and injected into the second stage vessel 3, which operates under moderately reduced pressure and elevated temperatures to flash off excess glycol. Liquid product from vessel 3 is transferred through conduit 4 to prepolymerizer 5 where the pressure is reduced further and the temperature is raised to give a low molecular weight prepolymer. The prepolymer is fed continuously through transfer line 6 to finish polymerizer 7 where the polymerization is completed at about 273° to about 290° C. The polymer is fed through conduit 8 to spinning machine 9 where it is melt spun into filaments. The 2,2-bis-[4-(2-hydroxyethoxy)-3,5-dibromophenyl] propane is fed from hopper 10 into melt-tank 11 and then into feed tank 12, where it is maintained molten. A molten stream of HDP is continuously injected through line 13 into conduit 2 by metering pump 14. The optical brightener, toner and any additional ingredients such as titanium dioxide are also injected into the di-β-hydroxyethyl terephthalate monomer flowing through conduit 2. To facilitate addition of such materials to the monomer stream ethylene glycol slurries of these additives may be employed.

The HDP used must be of high purity. It must form a solution in acetone, containing 5 grams of HDP in 50 milliliters of solution, which has an APHA color of less than 35. Preferably the APHA color is 10 to 25. The APHA color value is determined by the procedure specified in ASTM E-2108-62T. HDP having high color values has been found to cause yellowing of the copolyester.

The color of the copolyester is dependent upon time and temperature employed in the polymerization process. When time and temperatures of reaction above a certain level are employed, an unacceptable color is realized. In accordance with the present invention flame retardant filaments of excellent whiteness are produced when the polymerization is conducted within a holdup time of 2.5 hours at temperatures from about 273° to about 290° C. The holdup time is defined as the pounds of material undergoing polymerization divided by the pounds per hour of throughput.

The amount of HDP used is also important. Less than about 4 mole percent HDP does not provide adequate flame resistance, but increases above about 5 mole percent do not significantly improve the flame resistance. Unacceptable discoloration becomes increasingly difficult to avoid at higher amounts.

The presence of amines or alkaline salts should be avoided since these cause development of objectionable color at the high temperatures used in the process for preparing the copolyester filaments.

In addition to having little, if any yellowness, it is essential that the polyester fibers of this invention not be toxic or contain substances to which wearers of apparel made from the fibers would be sensitive. It is sometimes desirable to purify commercial grades of HDP, for example by recrystallization from a suitable solvent such as isopropanol, in order to remove undesirable contaminants.

In accordance with the process of the present invention it has been found that the use of optical toners and brighteners with HDP provides polyester filaments having excellent whiteness while maintaining superior flame retardant properties. An optical brightener such as 7-naphtha-triazinyl-3-phenylcoumarin can be employed with superior results being obtained in the 125–200 ppm range, but up to about 400 parts may be effectively used. As a suitable blue toner Shepherd Blue No. 3 can be used at levels up to about 100 ppm and preferably at levels in the range 25–75ppm. The optical brightener and toner are added to the di-$\beta$-hydroxyethyl terephthalate monomer, preferably as a slurry with ethylene glycol, at a suitable point in the process prior to prepolymer formation.

The improved polyester filaments of this invention are suitable for the preparation of many textiles where increased flame resistance is desirable or required. For some uses it may be desirable to make the filaments even more flame retardant and in these instances antimony oxide can be added to the polyesters. The amount of antimony oxide that can be used is preferably 1 to 2 percent by weight, based on the weight of the polyesters.

In the Examples, all percentages are by weight based on total weight unless otherwise specified.

The whiteness value is the $b$ value determined on a standard Hunter D25M Colorimeter using the measurement principles described by R. S. Hunter, J. Optical Soc. America, 48, 985 (1958). In this evaluation, a lower numerical value indicates an improvement in whiteness.

The degree of flame resistance is preferably measured by determining the "Limiting Oxygen Index" (L.O.I.) of a test specimen. Flame resistance is also measured as described in the DOC FF3-71 test. The L.O.I. test measures the percentage of oxygen in a slowly rising stream of gas which is required to just sustain "candle-type" burning of a vertically supported sample. The L.O.I. test is a very sensitive test which is capable of distinguishing between degrees of flammability much better than previously used tests that measure burning rate, or that only indicate if a sample will burn or not under the specific test conditions.

In the L.O.I. test, a fabric or film sample having a length of 8–15 centimeters and a width of 2.5 centimeters is supported vertically between the upright arms of a U-shaped clamp, a flame is applied to the top of the sample until it starts to burn, and then the sample is lowered into a tube (chimney) having a diameter of 10 centimeters which is supplied at the bottom with an adjustable mixture of air and oxygen or nitrogen moving up around the sample at a flow rate of 5 to 9 cubic centimeters per minute. The amount of nitrogen or oxygen added to the air introduced at the bottom of the tube is adjusted to give just enough oxygen to keep the flame burning. The fraction of oxygen in the gas mixture fed to the burning chamber is measured by the use of calibrated rotometers in the gas supply lines. This fraction is the L.O.I. value.

An L.O.I. value above 0.21, the fraction of oxygen in ordinary air at sea level, indicates flame retardancy. The higher the L.O.I. value obtained, the greater is the flame retardancy of the sample tested. L.O.I. values above 0.22 are desirable if the sample is to be considered "flame resistant".

Because polyester materials tend to melt and drip away from the flame, some additional means of sample support must be provided in the L.O.I. test to insure a correct result. If desired, the polyester tested can be made into a sandwich-like structure by pressing a layer of polyester material with a layer of glass fiber marquisette fabric. Alternatively, a polyester yarn may be plied with a glass fiber yarn and made into a self-supporting fabric.

EXAMPLE I

This example illustrates preparation of flame-resistant copolyester filaments from di-$\beta$-hydroxyethyl terephthalate and 2,2-bis-[4-(2-hydroxyethoxy)-3,5-dibromophenyl] propane (HDP).

A molten stream of HDP having an APHA color of 12–14 is heated to 180° C. and is continuously injected at a level of 12 weight percent, based on the final weight of the polymer, into a molten stream of di-$\beta$-hydroxyethyl terephthalate. The combined ingredients are then passed through a flasher and a prepolymerizer to a finisher vessel. The temperature of the finisher is held at 285° C. and the pressure at 1.5 millimeters of mercury or less. The flow of polymer out of the finisher is controlled to maintain a holdup time of approximately 2.5 hours. The finished polymer is spun at 285° C. through fifteen 855-hole spinnerets (orifice diameter of 0.381 millimeters) to produce filaments which are collected as a yarn at 1550 yards (1420 meters) per minute. The polymer has a relative viscosity of 19. A creel stock is prepared from 27 of these yarns and the yarns combined to form a tow which is drawn at a draw ratio of about 3. The tow is drawn at 200 yards (183 meters) per minute in an aqueous draw bath at 98° C. The tow is then crimped, relaxed and cut to staple fibers. The copolyester fibers have a denier of 1.5, a tenacity between 3.5 and 4.5 grams per denier and an elongation of 40 to 50%, contain 4 mole % of HDP units and have a whiteness value of 5.0. When the above preparation is repeated except that the holdup time is increased about 0.5 hour, the filament whiteness deteriorates to a value of 11.6.

EXAMPLE II

This example illustrates the use of brighteners and toners to improve the whiteness of flame retarded copolyester filaments.

A molten stream of HDP having an APHA color of 30–35 is heated to 180° C. and is continuously injected at a level of 12 weight %, based on final polymer weight, into a molten stream of di-β-hydroxyethyl terephthalate. The combined ingredients are then passed through a flasher and a prepolymerizer to a finisher vessel. The temperature of the finisher is held at 273° C. and the pressure at 2.5 millimeters of mercury. The finisher holdup time is adjusted to approximately 0.75 hour. The copolyester produced has a whiteness value of 6.6. When 400 ppm of 7-naphthatriazinyl-3-phenylcoumarin and 75 ppm of blue toner (Shepherd Blue No. 3) are also injected, as ethylene glycol slurries, into the diglycol terephthalates and the polymer spun into filaments, the filaments are found to have a whiteness value of 0.4.

EXAMPLE III

This example illustrates the flame resistance of a copolyester containing HDP units.

A sample of polyester prepared as described in Example I and containing 4 mole % of HDP units is ground in a cooled mill to give a powder which passes through a 40-mesh screen. A portion of the powder is mixed in a mortar with powdered antimony oxide. In separate runs, the powders are pressed into an 8-mil (0.2 millimeter) film, along with a sheet of fiberglass marquisette for support, using a laboratory press heated to a temperature of 280° C. In pressing the film, minimum pressure is exerted for 10 seconds and then the pressure is increased to 5,000 pounds (2260 kg) for 10 seconds. The pressed film is quenched in water. Film samples are also pressed from powdered polyethylene terephthalate polymer for comparison. These films, Samples A, B, and C, are then tested for flame resistance in the L.O.I. test with the results shown in Table 1.

TABLE 1

| Sample | Mole % HDP | % $Sb_2O_3$ | L.O.I. |
|---|---|---|---|
| A | 4 | 0 | 0.225 |
| B | 4 | 1 | 0.240 |
| C | 0 | 0 | 0.193 |

The data in the table indicates the improvement in flame resistance provided by HDP alone, and the even greater improvement provided by the use of antimony oxide.

The flame resistance of copolyesters containing HDP is further illustrated by testing a fabric made from staple prepared in a manner similar to that described in Example I. A 4.6-oz./yd.$^2$ (109 grams/square meter) plain weave fabric is prepared and tested in the vertical flammability test of DOC FF 3-71, except that the fabric-holding frame is 4 inches wide. Three fabric samples are tested and the burn lengths obtained are shown in Table 2 with the values being the average of fifteen determinations per sample. The burn time of the samples is also shown in the table. The results illustrate the flame resistance offered by the HDP copolyester over the polyethylene terephthalate control.

TABLE 2

| Sample S | Mole % HDP | Burn Time (Sec.) | Burn Length (cm) |
|---|---|---|---|
| A | 0 | 28.0 | 9.8 |
| B | 4 | 7.9 | 9.6 |
| C | 5 | 7.1 | 8.7 |

We claim:
1. A fiber-forming copolyester having excellent whiteness and increased flame retardance derived from dimethyl terephthalate, ethylene glycol and about 4 to 5 mol percent 2,2-bis-[4-(2-hydroxyethoxy)-3,5-dibromophenyl]propane based on glycol terephthalate structural units present in the copolyester product and containing 1 to 2 percent antimony oxide based on the weight of the copolyester.

2. The fiber-forming copolyester of claim 1 wherein the 2,2-bis-[4-(2-hydroxyethoxy)-3,5-dibromophenyl]-propane has an APHA color less than 35.

3. The fiber-forming copolyester of claim 2 wherein the copolyester is formed by continuously feeding the dimethyl terephthalate and ethylene glycol components with catalyst to an ester interchange means and reacting the components to form di-β-hydroxyethyl terephthalate monomer, feeding a molten stream of 2,2-bis[4-(2-hydroxyethoxy)-3,5-dibromophenyl]propane to said monomer and pre-polymerizing the mixture to form a low molecular weight prepolymer and then feeding said prepolymer to a finish polymerizer and completing the polymerization within a holdup time of 2 to 5 hours at temperatures from about 273° to 290°C.

4. The fiber-forming copolyester of claim 3 wherein the 2,2-bis-[4-(2-hydroxyethoxy)3,5-dibromophenyl]-propane has an APHA color from about 10 to 25.

* * * * *